April 27, 1965 M. L. LEVENE 3,181,166

DATA STORAGE APPARATUS

Filed Dec. 2, 1957 3 Sheets-Sheet 1

INVENTOR.
Martin L. Levene
BY
[signature]
ATTORNEY.

INVENTOR.
Martin L. Levene

BY Morris L. Rabkin

ATTORNEY.

April 27, 1965 M. L. LEVENE 3,181,166

DATA STORAGE APPARATUS

Filed Dec. 2, 1957

3 Sheets-Sheet 3

INVENTOR.
Martin L. Levene
BY [signature]
ATTORNEY.

3,181,166
DATA STORAGE APPARATUS
Martin L. Levene, Philadelphia, Pa., assignor to Radio Corporation of America, a corporation of Delaware
Filed Dec. 2, 1957, Ser. No. 700,056
11 Claims. (Cl. 346—74)

This invention relates to data storage apparatus, and particularly to data storage apparatus of the magnetic type.

In magnetic storage apparatus such as drum, disc, tape and card apparatus, a magnetizable medium for storing data is moved relative to a transducing means. During such movement, flux changes are produced in the transducing means which changes correspond to information signals to be written onto, or read from, the magnetizable medium. The data or information may be encoded in pulse form, or it may be represented by a continuous time-varying, modulated wave.

In storage systems of the movable type, it is desirable to have a very small spacing between the medium and the pole tip of the transducing means. Small spacing provides advantages, for example, in signal-to-noise ratio, in packing density, in reduced signal energy required, etc. It is also desirable to separate the transducing means from the medium to prevent wear. In certain prior apparatuses, the spacing is made relatively wide in order to provide sufficient clearance to allow for mechanical and other imperfections.

It is an object of the present invention to provide improved data storage apparatus of the movable type.

Another object of the invention is to provide improved data storage apparatus using a novel means for obtaining a very small, constant spacing between the transducing means and the medium.

Still another object of the invention is to provide improved data storage apparatus of the movable type wherein a desired small, constant spacing automatically is maintained between the transducing means and the medium.

According to the present invention, relative movement is provided between the medium and the transducing means and a film of fluid, such as air, is used for separating the medium and the transducing means. The surface of the transducing means itself provides a step bearing consisting of two parts each displaced a different distance from the medium. The film flowing across the bearing surface exerts a force in a direction to separate the transducing means from the medium. The transducing means is mounted in a carriage, permitting reciprocal movement of the transducing means toward and away from the medium. A second force is applied to the carriage in a direction to move the transducing means towards the medium. The spacing between the transducing means and the medium is less than the boundary layer thickness of the film of fluid resulting from the movement of the medium.

A feature of the invention is that the two forces act to maintain a small, constant spacing even though slight mechanical imperfections, such as run-out, wobble, surface irregularities in the medium, and the like, exist. When the equilibrium condition is disturbed, as by a mechanical imperfection, the two forces increase and decrease in proper directions to restore the initial equilibrium condition over a negligible time interval.

Figure 1:
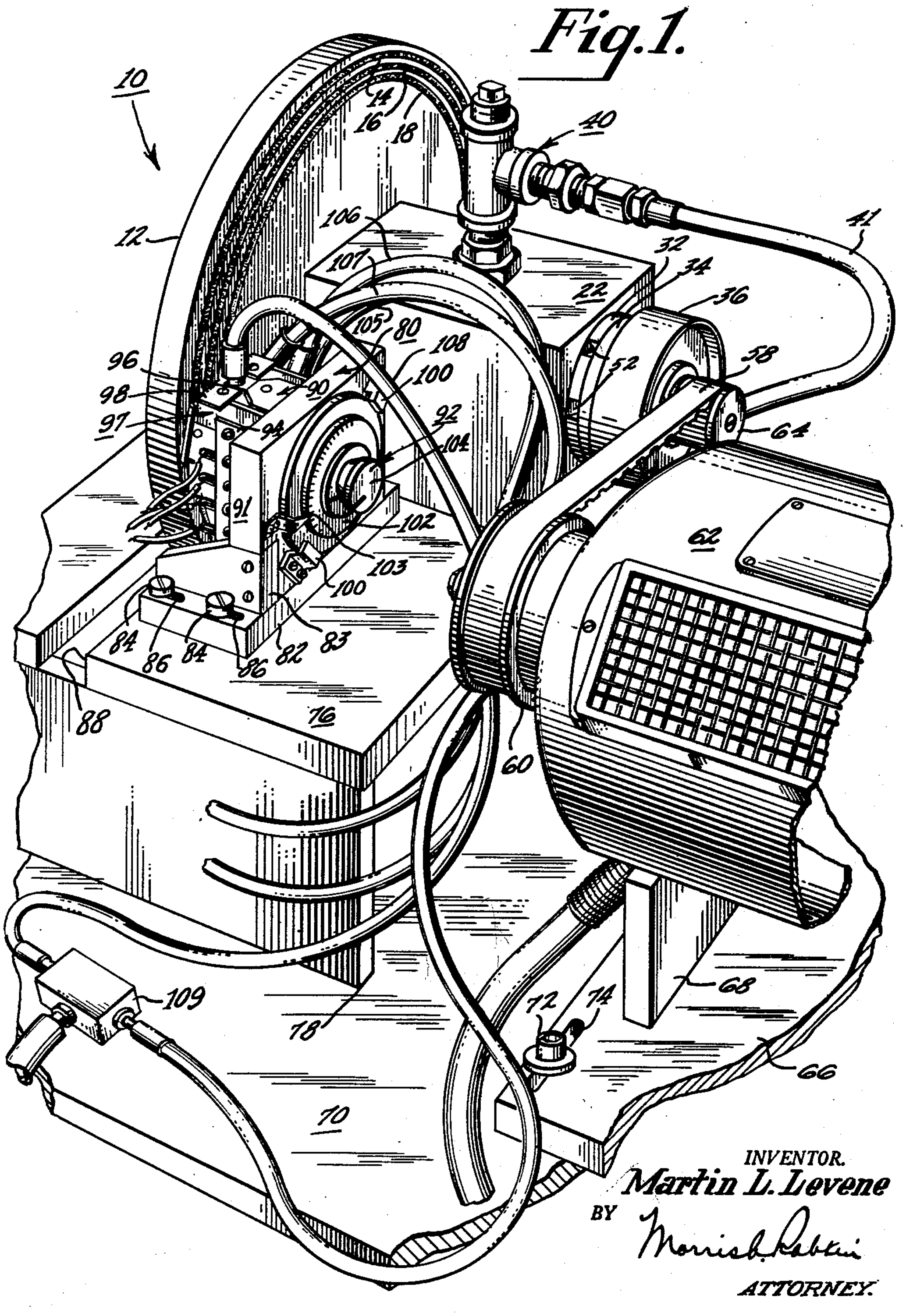
FIG. 1 is a perspective view, partially broken away, of a data storage apparatus according to the invention.

In the data storage apparatus 10 of FIG. 1, information is stored, for example, on a disc 12 having on its face a plurality of tracks 14, 16 and 18 of magnetizable material. In practice, the magnetizable material may be coated or evaporated over the entire face of the disc 12. The tracks then correspond to narrow bands or spots of the material which pass within the pole-tip regions of transducing means during rotation of the disc 12. The tracks may be concentric, as shown, or spiral. The disc 12 is rotated about a horizontal axis by means of a shaft 20 (FIG. 2) mounted within a bearing housing 22. The shaft 20 is attached to the disc 12 by any suitable means, as by positioning dowel pins and by a clamping nut screwed onto a threaded end of the shaft 20 extended through the disc 12. The dowel pins also prevent relative rotation between the disc 12 and the shaft 20. In addition, a nut 24 secures a flanged balance cup 26 against a washer 27 located between the disc 12 and the cup 26.

Figure 2:
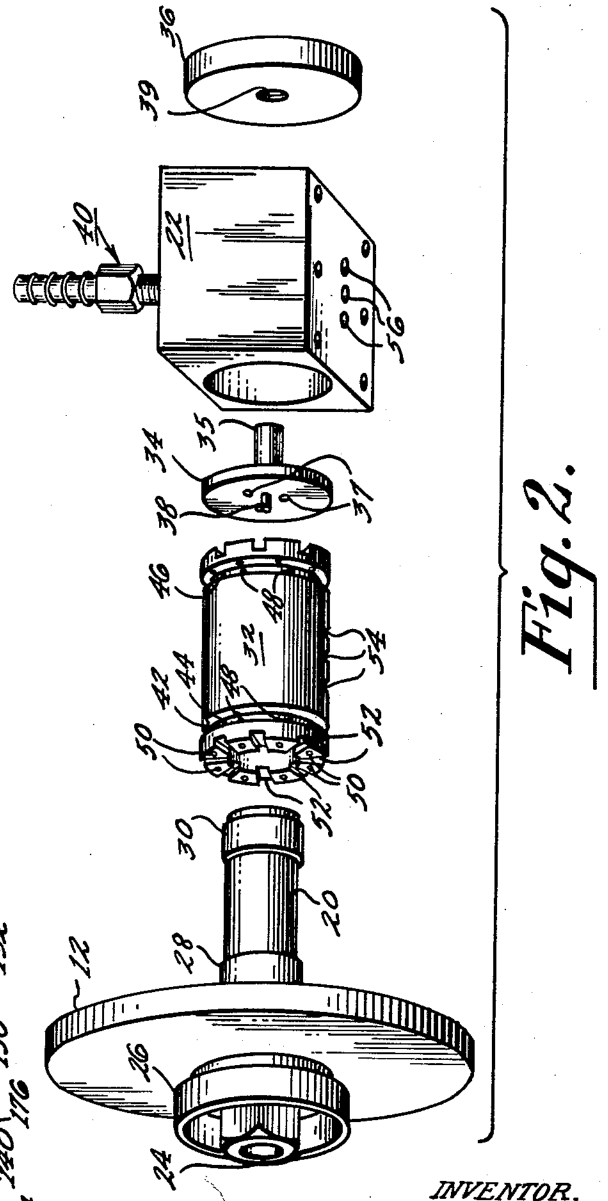
FIG. 2 is an exploded view of the radial-bearing and thrust-bearing means for the disc 12 of FIG. 1.

As shown in FIG. 2, the shaft 20 is undercut at the end portions and at its center portion to provide a pair of machined journal-bearing surfaces 28 and 30. The journal surfaces 28 and 30 provide pressurized fluid, radial-bearing means for the shaft 20, as described more fully hereinafter. The shaft 20 is fitted in an orifice sleeve 32 to bear against a first thrust pad 34. The thrust pad 34 is fastened to the shaft 20 by any suitable means such as screws, not shown, threaded through holes 37 in the thrust pad 34. Centering pin 38 is used in locating the position of the thrust pad 34 relative to the shaft 20. Another similar thrust pad 34, not shown, is fitted against the surface of the disc 12 as by a flange means extending radially from the shaft 20 on the disc side of the journal surface 28. The thrust pads 34 provide pressurized fluid, thrust-bearing means for the shaft 20, as described more fully hereinafter.

The orifice sleeve 32 is fitted in the bearing housing 22 by any suitable means, as by a press fit. Another balance cup 36 is secured to the thrust pad 34 as by a press fit of the shaft 35 of the thrust pad 34 in a hole 39 bored in the center of the balance cup 36. Suitable balance weights may be attached in the balance cups 26 and 36 to aid in eliminating wobble in the disc 12.

The bearing housing 22 (FIG. 1) is provided with a threaded opening for receiving suitable piping connections, indicated generally by the reference numeral 40. An air hose 41, or other suitable conduit, is connected to the piping 40 for introducing pressurized fluid into the bearing housing 22. The pressurized fluid may be air or other suitable gases or gaseous mixtures, if desired. The threaded opening in the bearing housing 22 (FIG. 2) connects with an axial slot 42 in the orifice sleeve 32. The slot 42 conducts the pressurized fluid to a pair of annular orifice grooves 44 and 46 cut in the orifice sleeve 32. Radial orifices 48 are drilled through the orifice grooves 44 and 46 to direct the pressurized fluid against the journal surfaces 28 and 30 of the shaft 20. Axial orifices 50 are drilled between the end portions of the orifice sleeve 32 and the orifice grooves 44 and 46 to direct the pressurized fluid against the thrust pads 34. Radial exhaust slots 52 are cut in the end portions of the orifice sleeve 32 between the thrust-bearing orifices 50. The exhaust slots 50 are used to discharge the pressurized fluid from the thrust-bearing spaces and from the outside portions of the radial-bearing spaces via undercut ends of shaft 20 to the atmosphere, as shown in FIG. 1. The pressurized fluid from the inside portions of the radial-bearing spaces discharges into the cylindrical chamber formed by the center undercut portion of the shaft 20 (FIG. 2) and the inside wall of the orifice sleeve 32. Exhaust holes 54 in the orifice sleeve 32 mate with exhaust holes 56 in the bearing housing 22 to conduct the fluid from the orifice sleeve chamber to the atmosphere.

Rotary power is supplied to the disc 12 by means of a timing belt 58 (FIG. 1) connected between a driver pulley 60 on the rotor shaft of an electric motor 62 and a driven pulley 64 having a screw 65 fastened to the pin 35 (FIG. 2) of the thrust pad 34. The motor 62 (FIG. 1) is mounted on a motor stand 66 by means of a pair of pillow blocks 68 only one of which is shown. The motor stand 66 is attached to a base plate 70 by means of bolts 72. The bolts 72 are fitted through longitudinally elongated slots 74 in the motor stand 66 for adjusting the tension of the pulley belt 58.

An elevated platform 76 is used for supporting the bearing housing 22 and for supporting a transducing means housing 80. The elevated platform 76 is supported by means of vertical support plates 78 attached to the base plate 70. The transducing means housing 80 is mounted on the elevated platform 76 by means of a webbing network including a horizontal support plate 82 and gusset plates 83. Screw means, such as the screws 85, are used to secure the housing 80 to the webbing network. The support plate 82 is bolted to the platform 76 by means of bolts 84 fitted through transverse, elongated slots 86 in the support plate 82. The elongated slots 86 provide a coarse adjustment for positioning the housing 80 towards and away from the disc 12. A slot 88 is provided in the elevated platform 76 for rotation of the disc 12.

A transducing means assembly 90, described more fully hereinafter in connection with FIGS. 3–8, is fitted in a vertical back plate 91 of the housing 80. A rotator 92, attached to the transducing means assembly 90, is used for adjusting the relative angular positioning of the transducing means 90 and the disc 12. Also secured to the horizontal support plate 82 is a terminal board 94. A U-shaped block 96 of insulating material, such as Bakelite material, is attached to the transducing means assembly 90. A spring means 98 is secured to the top of the Bakelite block 96. The rotator 92 is secured to the housing 80 by means of clamps 100. A dial 102, a dial pointer 103, and a dial knob 104 are provided for the rotator 92.

Four hoses 105, 106, 107 and 108 conduct pressurized fluid to the housing 80 for reasons described hereinafter. Two of the hoses 105 and 106 are connected to a T connection 109. The same fluid source, not shown, may be used for supplying the pressurized fluid to the bearing housing 22 and the transducing means housing 80.

Figure 6:
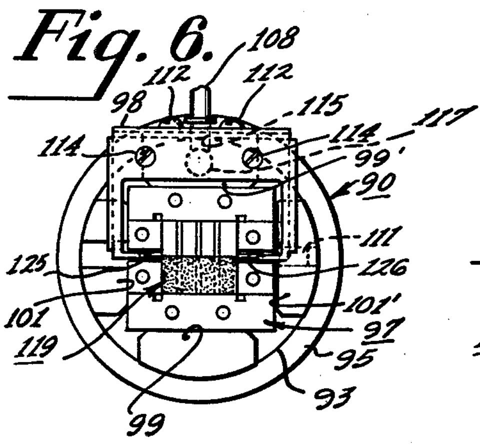
FIG. 6 is a front view of the support structure for the transducing means of the apparatus of FIG. 1.
Figure 7:
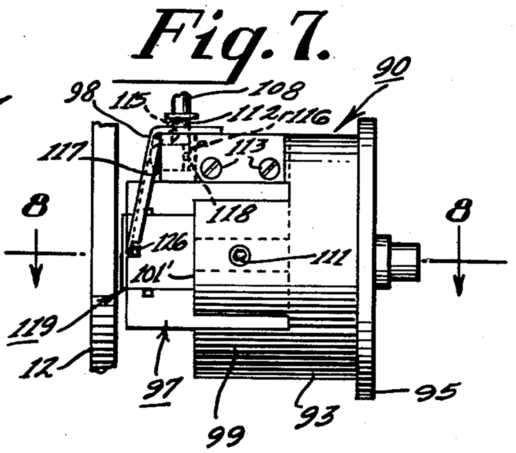
FIG. 7 is another side view of the support structure for the transducing means of the apparatus of FIG. 1.
Figure 8:
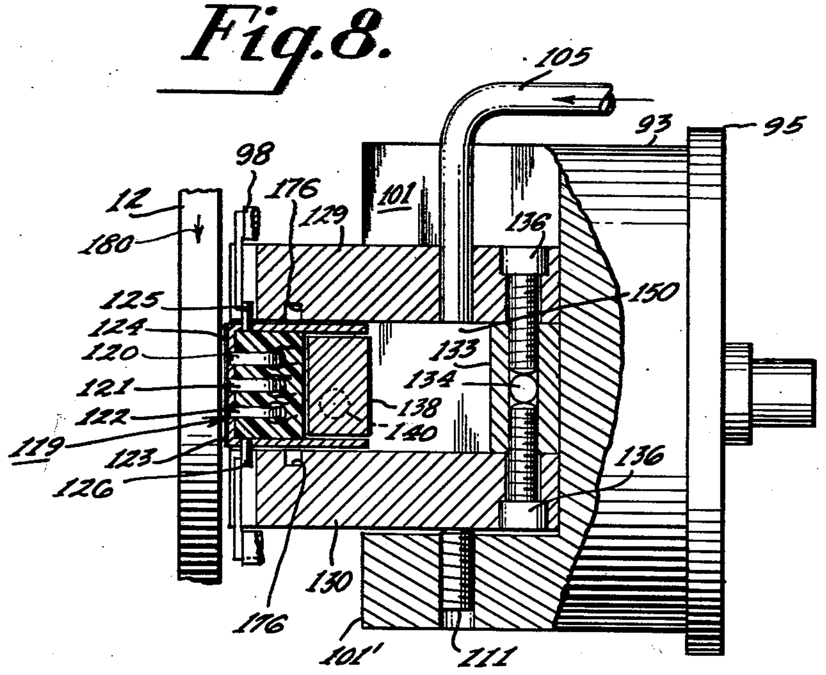
FIG. 8 is a top view, partially in section, along the line 8—8 of the support structure of FIG. 7.

As shown in FIGS. 6–8, the transducing means assembly 90 has a cylindrically-shaped carrier 93 for the transducing means or magnetic heads. The head carrier 93 is fitted, as by a light-running fit, into a circular hole in the vertical support plate 91 (FIG. 1) of the webbing network. Four finger-like extensions are made in the head carrier 93 (FIG. 7) for receiving a head assembly 97. The head assembly 97 is rectangular in shape and is fitted against a lower machined surface 99 and a side machined surface 101 within the carrier 93 by means of set screws 110 and 111. The set screws 110 and 111 are threaded through an upper extension 99′ and another side extension 101′ of the head carrier 93. The spring means 98 is attached to the insulating block 96 by means of screws 112. The insulating block 96 is attached to the head carrier 93 by means of screws 113. Screws 114 are threaded through the spring means 98 at the front face of the block 96 to limit the maximum outward movement of the arms of spring 98. A vertical channel 115 is drilled in the top portion of the head carrier 93 to connect with a horizontal piston chamber 116 carrying a piston 117. A small nib 118 is provided at one end of the piston 117 to abut against the rear wall of the piston chamber 116 in the absence of pressurized fluid in the chamber 116. Pressurized fluid is supplied to the piston chamber 116 by means of the hose 108 of FIG. 1. A shaft 115, extending from the back surface of the head carrier 93, is attached to the dial knob 104 (FIG. 1) by any suitable means such as a set screw, not shown. Thus, by rotating the dial knob 104 of the rotator 92, the entire head carrier 93 is correspondingly rotated a like amount within the transducing means assembly 80, FIG. 1. The clamps 100 maintain the head carrier 93 in a desired rotated position.

Figure 3:
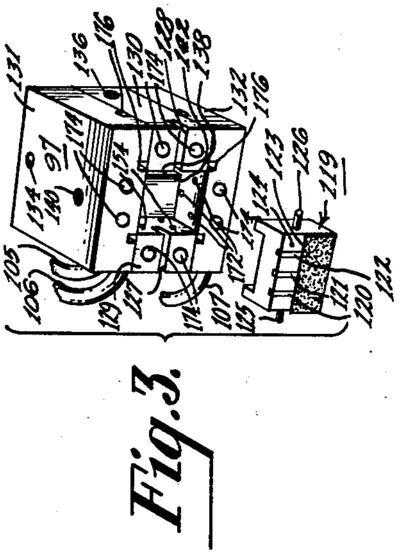
FIGS. 3 and 4 are perspective views of the support structure for the transducing means of the apparatus of FIG. 1.
Figure 4:
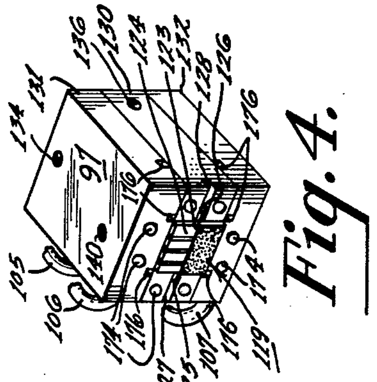
Figure 5:
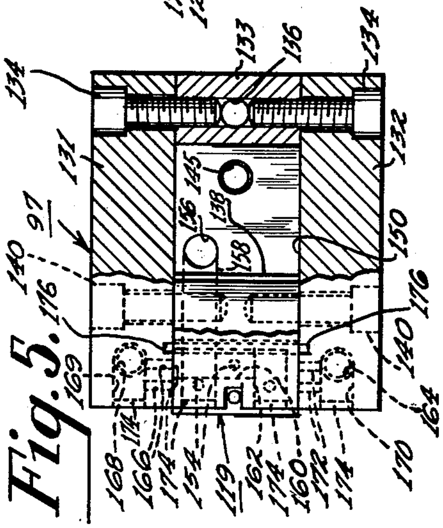
FIG. 5 is a side view, partially broken away, of the support structure for the transducing means of the apparatus of FIG. 1.

Details of the head assembly 97 are shown in FIGS. 3, 4 and 5. The head assembly 97 has an opening in the front face thereof for supporting a head carriage 119. The head carriage 119 generally is U-shaped and supports, for example, three magnetic transducing means or heads 120, 121 and 122, for respectively coupling to the tracks 14, 16 and 18 of the disc 12, FIG. 1. Coated on the front face of the head carriage 119 is a step 123 which covers the lower half of the front face of the head carriage 119. The bearing step 123 may be an evaporated coating of silicon-monoxide of approximately 50 microinches thick. The bearing step 123 and the upper uncoated portion 124 of the face of the head carriage 119 together provide a step bearing. The purpose of the step bearing is explained more fully in connection with the description of the operation of the apparatus.

A pair of pins 125, 126, extend from the side surfaces of the head carriage 119 for mounting within slots 127 and 128, respectively, in the head assembly 97. The head assembly 97 is made up of six separate pieces, machined to close tolerances, and fastened together by any suitable means, such as screw means. The slots 127 and 128 are machined in the front surfaces of a pair of side pieces 129 and 130. The top and bottom pieces 131 and 132 are separated from each other by the side pieces 129 and 130. The top, bottom and side pieces are secured to a back piece 133, FIG. 5, by means of countersunk screws 134 in the top and bottom pieces 131, 132 and screws 136 in the side pieces. The top and bottom pieces 131, 132 are secured to a central fixed piece 138, FIG. 5, by means of countersunk screws 140. Spaces 142 at either side of middle piece 139 are provided for receiving the legs of the head carriage 119. Channeling networks and orifices are cut in the head assembly 97 to provide pressurized bearing surfaces for the movable carriage 119 and to provide pressurized fluid for moving the head carriage 119 outwardly towards the face of the disc 12.

Pressurized fluid is introduced by means of an inlet port 145, FIG. 5, to a piston chamber 150 provided in the rear central portion of the head assembly 97. The pressurized fluid is conducted from the piston chamber 150 to orifices 154 in the side pieces 129 and 130 to provide pressurized bearing surfaces for the reciprocal movement of the head carriage 119 along these surfaces. The orifices 154 are connected to the piston chamber 150 by means of an outlet hole 156 provided in the left side piece 129. The outlet hole 156 is connected to a longitudinal channel 158 in the left side piece 129. The longitudinal channel 158 connects with another longitudinal channel 162 in the left side piece 129 via a vertical channel 160. A similar channeling network supplies fluid to the orifices in the right side piece 130. A film of pressurized fluid for the bottom surface of the head carriage 119 is supplied by orifices 172 drilled in the bottom piece 132 of the head assembly 97.

The pressurized fluid for the bottom surface of the head carriage 119 is introduced by hose 107 connecting with an inlet channel 164 in the bottom piece 132. The inlet channel 164 connects with the innermost orifice 172 and connects with longitudinal channels 170 in the bottom piece 132. The longitudinal channels 170 connect with the outermost ones of the orifices 172. Pressurized fluid for the upper bearing surface of the head carriage 119 is supplied by orifices 166 drilled in the upper piece 131.

Pressurized fluid is introduced, from hose 106, to a transverse channel 168 cut in the top piece 131 to which the innermost one of the orifices 166 is connected. Longitudinal channels 169 in the top piece 131 connect the outermost orifices 164 to the transverse channel 168. Plug means, such as plugs 174, are provided to block the pressurized fluid from escaping from the various channels bored in the various pieces of the head assembly 97. Eight exhaust grooves 176 are cut in the upper and lower pieces 131, 132 and in the side pieces 129, 130 at locations corresponding to the edges of the head carriage 119 to permit the pressurized fluid to exhaust to the atmosphere.

In operation, pressurized fluid is first supplied to the bearing housing 22, thereby supplying pressurized-fluid radial and thrust-bearings for the shaft 20 of the disc 12. The disc 12 is rotated at any desired speed by the motor 62. The pressurized fluid provides a thin film on the journal surfaces 128 and 130, FIG. 2, of the shaft 20. This thin film tends to maintain the disc 12 concentric within the bearing housing 22. Variations in radial load are automatically compensated for by the film thicknesses correspondingly increasing and decreasing on either side of the journal surfaces 28 and 30. Likewise, the thin films on the thrust-bearing pads 34 tend to maintain a constant axial position of the disc 12 by suitably increasing and decreasing the film thicknesses on the thrust pads 34 on either side of the orifice sleeve 32. Effectively, these thin-film pressurized bearings provide a universal bearing for the disc 12 which operates automatically to compensate for variations in radial and thrust loads. Such a universal-type bearing is highly advantageous in high-speed information-handling systems wherein any change in disc speed, due to adverse loading conditions, could result in incorrect reading or writing of information on the disc 12.

In the device of the present invention, due to this universal-type bearing, any end change in axial position of the disc is small and, as described hereinafter, is automatically compensated for by like axial movement of the head carriage 119. Furthermore, in certain applications in a movable vehicle, a universal-type bearing is desirable because the absolute position in space of the disc may vary. Again, such variation in the absolute position of the disc causes variations in the load which must be compensated for if the information is to be written and read accurately. Also, the thin, pressurized film bearings provide a substantially frictionless mounting for the shaft 20 and the disc 12, thereby permitting the use of a smaller horsepower motor 62 for a given disc speed.

Initially, the pressurized fluid is not supplied to any of the other hoses 105, 106, 107 and 108 and, accordingly, the spring means 98 maintains the head carriage 117 in its retracted position (FIG. 8). Rotation of the disc 12 in the direction of the arrow 180 drags a boundary layer of air along its surface between the displaced steps 123, 124 of the head carriage 119. A pressure differential results when the layer of air is carried across the step bearing 123, 124, thereby producing a force tending to maintain the head carriage 119 in its retracted position. An article by Lord Rayleigh, entitled "Notes on the Theory of Lubrication," published in the Philosophical Magazine, vol. XXXV, pages 1–12, 1918, describes a theory of operation of a step bearing. Such a Rayleigh step bearing is a "hydrodynamic step bearing." A hydrodynamic step bearing is characterized by the fact that, unlike a hydrostatic step bearing, no internal source of pressurized fluid is required to provide a force to maintain the step bearing spaced apart from an adjacent surface (the disc 12). Instead, when the step bearing and the adjacent surface are moved relative to each other in an ambient fluid (such as air), the step on the bearing creates a pressure differential in the fluid and develops the necessary force for separating the step bearing and the adjacent surface. See "Theory and Practice of Lubrication for Engineers" by D. D. Fuller, Wiley & Sons, 1956.

After the disc 12 has reached its desired speed, pressurized fluid is introduced into the hoses 106 and 107, (FIG. 3). This pressurized fluid flows into the bearing spaces between the head carriage 119 and the top and bottom walls of head assembly 97. Air is then admitted through hoses 105 and 108 to provide pressurized fluid in the piston chambers 150 and 116. The pressurized fluid in the piston chamber 116 applies a force in a direction to move the piston 117 to the left, as viewed in the drawing (FIG. 7), thereby moving the spring means 98 away from the pins 125, 126 of the head carriage 119. The head carriage 119 thus is free to move in a direction towards the face of the disc 12 (FIG. 8). Pressurized fluid in the chamber 150 forces the head carriage 119 to the left, as viewed in the drawing. The two forces acting on the head carriage 119 oppose each other. By suitably adjusting the pressure of the fluid in the chamber 150, a stable equilibrium position is reached a short distance from the face of the disc 12. In the exemplary embodiment shown in FIG. 1, an equilibrium position was reached at a spacing of approximately 100 micro-inches for a tangential speed of 5000 inches per second of the disc 12 relative to the head carriage 119, using a pressure of about 20 pounds per square inch (gauge) for the piston 117 and the head carriage 119.

The amount of pressure exerted on the step bearing 123, 124 may be adjusted by rotating the transducing means assembly 90 (FIG. 7) such that the angle of the edge of the step 123 is varied between zero and 90 degrees. Theoretically, the maximum pressure is exerted against the step bearing 123, 124 at an angle of zero degrees, and no pressure is exerted against the step bearing 123, 124 at an angle of 90 degrees. When the pressurized fluid is removed from the hose 108, the spring means 98 automatically retracts the head carriage 117 away from the face of the disc 12.

The head carriage 119 is supported, centered and guided by the pressurized-fluid bearing between the head carriage 119 and the head assembly 97. In practice, the head carriage 119 is floated on air bearings and reciprocal movement is obtained which essentially is free from sliding friction, having relatively low viscous drag forces. In practice, this means that the head carriage 119 and the reciprocal movement thereof is made at a relatively high frequency to follow surface irregularities in the magnetic coating of the disc 12, thereby maintaining a constant spacing.

In the present invention, the purpose of the step bearing 123, 124 is to obtain a minimum, constant clearance rather than supporting a load. In fact, pressurized fluid is applied to the legs of the head carriage 119 in order to force the step bearing 123, 124 to a spacing within the boundary layer thickness of the film of air dragged along the surface of the disc 12. In effect, an artificial load is obtained which tends to assure a constant clearance for a given disc speed.

In constructing apparatus according to the invention, the coating of magnetizable material on the disc surface is made sufficiently smooth so that the value of the surface roughness is small relative to the height of bearing step 123, say a value of about 20 to 1. Also, the surfaces of magnetic heads 120, 122 are maintained within the same order of surface roughness.

There has been described herein improved data storage apparatus using novel means for maintaining a close, constant clearance between a magnetic coating and a transducing means. For convenience of drawing and explanation, only a single head assembly has been illustrated. It is understood, however, that a plurality of head assemblies, each similar to the head assembly 90, may be provided at various points along the periphery of the disc 12. Also, if desired, suitable positioning means may be provided for moving the head assembly 90 across the disc face for reading and writing on successive, different tracks on the disc 12. The head assembly 90 may be provided with more or less than the three magnetic heads illustrated. An additional bearing housing, similar to housing 22, may be provided on the opposite side of the disc 12, if desired.

The novel step-bearing means of the invention is applicable to other forms of data storage apparatus, such as magnetic drums, as will be apparent to those skilled in the art.

What is claimed is:

1. Data storage apparatus comprising a first member having magnetizable material on one surface thereof, a second member having transducing means for cooperating with said medium, a hydrodynamic step bearing on the face of said second member for applying a force for separating said members during rotation of said first member, and fluid pressure means for advancing said second member towards said first member.

2. Data storage apparatus as claimed in claim 1, including means for rotating said step bearing relative to said first member.

3. Data storage apparatus comprising a rotatable member having magnetizable material thereon, transducing means for coupling to said material, a carriage for said transducing means, a support member for supporting said carriage, means for moving said carriage within said support member, said last-mentioned means including a step bearing on the end of said carriage nearest said rotatable member, and fluid pressure means for applying a force in one direction against the end of said carriage opposite said one end, said step bearing operating to apply a force in the opposite direction to said carriage during rotation of said rotatable member, said opposing forces reaching an equilibrium condition and operating to maintain a constant spacing between said transducing means and said material.

4. Data storage apparatus as claimed in claim 3, including pressurized fluid bearing means for floating said carriage within said support member.

5. Data storage apparatus as claimed in claim 3, including means for rotating said carriage within said support member.

6. A data storage apparatus comprising a disc mounted for rotation about one axis thereof and having magnetizable material on one surface thereof, pressurized fluid radial and thrust-bearing means for supporting said disc during rotation thereof, a magnetic head assembly, a carriage for said assembly, a housing for said carriage, said head assembly being reciprocally mounted in said carriage, and said carriage being rotatably mounted in said housing, said assembly having a stepped portion on the front face for providing with said disc surface a hydrodynamic step bearing for applying a force tending to separate said assembly from said disc surface during rotation of said disc, pneumatic means for applying a force against the back portion of said assembly tending to advance said assembly towards said disc surface, said forces having an equilibrium condition at a constant distance from said surface.

7. A data storage apparatus as claimed in claim 6, said head assembly including a plurality of magnetic heads each cooperating with a different portion of said material.

8. A data storage apparatus as claimed in claim 6, including spring means operatively engaging said assembly to maintain said assembly spaced from said surface a distance greater than said constant distance, and further pneumatic means for disengaging said spring means from said assembly during the travel of said assembly between said greater and said constant distances.

9. In a data storage apparatus, the combination comprising a rotatable disc having magnetizable material on one surface thereof, a shaft for rotating said disc, pressurized fluid radial and thrust-bearings for supporting said shaft when said disc is rotating, a reciprocally mounted head assembly having a plurality of magnetic heads, each coupling to a different portion of said material, said assembly having a stepped portion on the front face thereof for forming a step bearing with said disc surface, a support means for said head assembly, said support means having a hollowed portion for forming with said head assembly a piston chamber, and means for supplying pressurized fluid to said chamber for moving said head assembly towards said disc surface.

10. In a data storage apparatus, the combination as claimed in claim 8, including pressurized fluid bearing means for supporting said head assembly in said support means, and means for rotating said support means.

11. Data storage apparatus comprising a first member having magnetizable material on one surface thereof, a second member having transducing means for cooperating with said member, a step bearing on the face of said second member for applying a force for separating said members during rotation of said first member, fluid pressure means for advancing said second member towards said first member, means engaging said second member for maintaining said second member in a retracted position, and means for disengaging said last-mentioned means.

References Cited by the Examiner

UNITED STATES PATENTS

| | | | |
|---|---|---|---|
| 1,990,548 | 2/35 | Keller et al. | 179—100.2 X |
| 2,038,216 | 4/36 | Harrison et al. | 179—100.2 X |
| 2,671,700 | 3/54 | Seyffer | 179—100.2 |
| 2,772,135 | 11/56 | Holobaugh | 179—100.2 |
| 2,883,475 | 4/59 | Ridler et al. | 346—74 |
| 2,899,260 | 8/59 | Farrand et al. | 179—100.2 X |
| 2,905,768 | 9/59 | Cronquist | 179—100.2 X |
| 2,937,240 | 5/60 | Harker | 179—100.2 |
| 2,950,354 | 8/60 | Hohnecker | 179—100.2 |
| 2,957,051 | 10/60 | Epstein et al. | 179—100.2 |
| 3,005,675 | 10/61 | Le Din et al. | 179—100.2 |

FOREIGN PATENTS

| | | |
|---|---|---|
| 763,780 | 12/56 | Great Britain. |
| 778,112 | 7/57 | Great Britain. |

OTHER REFERENCES

Lubrication Engineering, pp. 298–301; December 1953, vol. 9, No. 6.

Philosophical Magazine, January 1918, pp. 1–12.

Mack's Mechanical Engineering Handbook, Baumeister, 1952, 6th Ed., McGraw-Hill, New York, pp. 8–133, TJ 151 M 37.

Bearing Design and Application, Wilcock and Booser, 1957, McGraw-Hill, pp. 319–321, 349, TJ 1061 W5.

Analysis and Lubrication of Bearings, Shaw and Macks, 1949, McGraw-Hill, pp. 314–316, TJ 1061 949.

Lubrication of Bearings, Barwell, 1956, pp. 193–196, TJ 1061, B 34.

Lubrication of Bearings, Radzemovsky, 1959, Ronald Press, New York, pp. 236–238, TJ 1061 R3.

IRVING L. SRAGOW, *Primary Examiner.*

CHESTER L. JUSTUS, ROBERT H. ROSE, NEWTON N. LOVEWELL, ELI J. SAX, *Examiners.*